United States Patent Office 3,284,225

Patented Nov. 8, 1966

3,284,225

RADIANT HEAT REFLECTIVE COATINGS AND METHOD FOR APPLICATION

Alden W. Smock, Huntsville, Ala., and Vaughn F. Seitzinger, Fayetteville, Tenn., assignors to the United States of America as represented by the Secretary of the Army No Drawing. Filed Jan. 14, 1963, Ser. No. 251,446
9 Claims. (Cl. 117—35)

The invention described herein may be manufactured and used by or for the Government for governmental purposes without the payment of any royalty thereon.

This invention relates to a method of providing metal surfaces with a ceramic-reflective metal coating which efficiently reflects radiant heat. Specifically, this invention pertains to a porcelain enamel-reflective metal coating, for use on metal surfaces, which serves as a reflecting surface for radiant heat and to the actual composition and method for applying the porcelain enamel-reflective metal coating.

Engineering advances have resulted in the need for efficient radiant heat reflective surfaces for metals. One means of providing such a surface is simply to polish the metal itself if it has inherently high reflectivity. However, such polished surfaces tend to oxidize, especially in the presence of heat. A widely accepted method of rendering metal surfaces reflective is to electroplate a thin layer of copper on the base metal surface, buffing the copper surface thus produced, electrodepositing a thin layer of gold on the surface of the copper, and subsequently buffing to give a polished gold surface. Such electroplated surfaces work very efficiently at relatively low temperatures. However, at higher temperatures the gold plated surface fails by diffusion of the copper through the gold and the formation of black copper oxide, so that the surface no longer reflects radiant heat. Consequently, the temperature of the base metal increases and fails.

An area in which the high temperature failure of electroplated gold has created particular problems is in the flame shields of rocket engines. A large portion of the radiant heat resulting from the combustion of the fuel in the rocket engine is reflected by the flame shield and, thus other components which would be damaged by high temperature are protected. Heat shields electroplated with gold begins to fail at temperatures about 700° F.

Another area in which metal surfaces electroplated with gold fail at high temperature is in heat reflectors for infrared lamps. Generally, these reflectors also fail at about 700° F. Infrared lamp reflectors consist of gold electroplated on copper and since the high thermal conductivity of copper is desired for the base metal in order to dissipate absorbed heat through such reflectors, it would be extremely advantageous to develop a more heat resistant reflective coating for copper.

Through the use of the present invention, it is possible to provide efficient radiant-heat reflective coatings for metal surfaces. These reflective coatings withstand much higher temperatures than do the conventional reflectors consisting of a reflective metal coating electrodeposited on the base metal surface. Briefly, the radiant heat reflective coatings of the invention comprise a porcelain coat bonded to the base metal surface. To the surface of the porcelain coat is bonded a thin layer of reflective metal. The infrared or radiant heat reflective coatings constructed in this manner function without failure up to 1550° F. or above for shorter periods of time or at lower temperature for correspondingly longer periods of time. Infrared lamp reflectors operate indefinitely at 900° F.

The porcelain enamel coating sandwiched between the base metal and the reflective metal coating serves as a diffusion barrier between the two metals. This barrier prevents the base metal from diffusing through the reflective metal thereby maintaining the reflective metal surface. As previously mentioned, when the metal base diffuses through the reflective metal surface, the efficiency of the reflector begins to decline and consequently more heat is absorbed causing more metal diffusion and as a result, the reflector fails. In the present invention, metal diffusion is eliminated since the metals are separated by a layer of heat resistant porcelain enamel.

The reflective coating of the invention offers other advantages in addition to its ability to withstand high temperatures. For example, a flame shield for a missile the size of the Jupiter produced by electroplating a layer of copper and a layer of gold on a steel surface requires approximately 1,000 man hours for completion. Most of this time is consumed in the two buffing operations, that is, of the copper base coat and the gold top coat. The gold reflective surface on the metal produced according to the invention requires no or only slight buffing. On a production line basis, the reflective coating of the invention can be applied to the flame shield and made ready for use in approximately 14 man hours per missile. Moreover, there is a slight saving in weight gained by the use of the ceramic-gold reflective coating. In the Jupiter flame shield, this amounts to about 7.6 pounds.

In smaller articles, this saving in time is still gained by the process of the invention. For example, to prepare a reflector for an infrared lamp by the electroplating process requires about six to eight man hours whereas these reflectors can be produced in four man hours using the method of the invention.

Moreover, the ceramic coating increases the fatigue strength and/or rigidity of sheet metals, such as flame shields, thus offering another desirable advantage in the use of the ceramic-gold reflective coating.

Another advantage in the ceramic-reflective metal coatings is the ability of the reflective metal surface to be easily repolished. For example, in the reflectors of infrared lamps, the gold surface electroplated on the copper base requires repolishing and buffing with jewelers rouge, taking particular care not to scratch the reflective surface, prior to electroplating a new gold coating which subsequently requires buffing to a high polish. A porcelain-gold reflective coating on a copper infrared lamp reflector is easily repolished with a paste of magnesium oxide in water and a cotton swab in one simple operation.

From the standpoint of economy, there is still another advantage to the ceramic-reflective metal coatings, particularly when the reflective metal is gold, silver, or platinum. The amount of metal comprising the reflective coating is considerably less than in those reflectors where the reflective coating is electrodeposited. The reflective metal coatings of the invention are on the order of 0.00001 inch or less in thickness, whereas electrodeposited coatings are normally at least 0.001 inch in thickness.

In view of the foregoing discussion, it is an object of the invention to provide ceramic-reflective metal radiant heat reflective coatings for metal surfaces.

Another object of the invention is to provide ceramic-radiant heat reflective metal coatings that are capable of withstanding high temperature.

A further object is to provide ceramic-radiant heat reflective metal coatings, for relatively thin sheet metal surfaces that increase the fatigue strength and/or rigidity of the metal.

A still further object of the invention is to provide ceramic-gold radiant heat reflective coatings especially suitable for use on stainless steel and copper surfaces at high temperatures.

Another object of the invention is to provide a method of producing a ceramic-radiant heat reflective coating for metals which is less time consuming than electroplating methods and results in a superior reflective surface from the standpoint of heat resistance.

A further object of the invention is to provide glossy, high temperature resistant porcelain enamels especially suitable for applying ceramic-reflective metal coatings to metal surfaces, particularly copper and stainless steel.

The manner in which these and other objects may be accomplished will become apparent from the detailed description of the invention given below.

Any metallic surface can be provided with a reflective coating according to the instant invention provided that the metal surface can be porcelain enameled. However, the metals generally used as the base metal in radiant heat reflectors are steel, particularly 300 series stainless steel, and copper. For this reason the reflective coatings discussed hereinafter are primarily intended for application to copper or 300 series stainless steel surfaces since these are the base metals usually employed when heat resistance is a factor to be considered.

The terminology, "radiant heat reflective metals" and "reflective metals" as used herein refers to those metals which are good reflectors of infrared waves when used as a smooth polished surface. Exemplary of such metals are copper, nickel, silver, platinum and gold. Depending on the specific environment in which a particular reflector is to be employed, any of these reflective metals can be effectively utilized. Platinum and gold are good choices for higher temperatures and especially corrosive atmospheres. Silver is an excellent reflector but should not be employed in an environment where sulfur is present as it will tarnish. Copper is a good choice for lower temperatures. However, the properties of these metals are well known and the selection of the particular metal best suited for any given application is within the ordinary skill of the art. Gold has proven to be completely satisfactory in the flame shield of the Jupiter rocket and in certain rearward portions of the Saturn rockets as well as in infrared lamp reflectors and is, therefore, preferred for these applications.

In relatively thin metals such as found in flame shields, for example those having a thickness of 0.020 inch, it is necessary to provide both the outer and inner surfaces with the ceramic coating to prevent possible warping as a result of the differential expansion of the metal and the enamel. Coating very thick metals, of course, eliminates having to coat any surface other than the one being prepared to reflect heat. It is obvious that the radiant heat reflective metal coat need be applied only to the surfaces which are to reflect heat.

The actual heat resistant reflective coating is a combination of high temperature resistant porcelain enamel and a layer of reflective metal. The coating comprises a layer of enamel bonded directly to the base metal surface and a layer of gold bonded to the surface of the enamel layer. For best results the enamel layer will normally be from 0.001 inch to 0.002 inch in thickness while the reflective metal coat will vary from about 0.000005 inch to about 0.00001 inch in thickness.

A porcelain enamel suitable as a ceramic material for sandwiching between the metal base and the gold reflective coating as a diffusion barrier should possess the following properties:

(1) Non-reboiling,
(2) High maturing temperature,
(3) Good gloss,
(4) Good adherence,
(5) Good workability in thin applications (1–2 mils).

When reboiling occurs small bubbles form which rupture and leave voids in the surface of the reflective coating. Because ground-coat enamels reboil during refiring, a cover-coat type of enamel is preferred for the reflective surfaces of the invention.

Since the basic ingredient in an enamel coating is the frit, an enamel for use at high temperatures must have a high temperature maturing frit. As used herein, the term high temperaturing maturing frits and enamels refers particularly to those enamels and frits which are fired at about 1500° F. or higher. Of course, enamels which mature at lower temperatures can be used. However, since heat resistance is the important factor in radiant heat reflectors it is obviously advantageous to employ the high temperature maturing enamels.

To establish the particular frit most suitable for withstanding high temperatures, it was necessary to formulate and mill several enamels, run a time-temperature maturing range on the enamels, and compare the results. Certain formulations of titanium opacified Solaramic frit No. 5210 (Ferro Corporation) produced enamels with the highest maturing temperature and is, therefore, preferred. However, other commercially available frits such as No. 1575, No. 1552, No. XT–263, and No. 1470 were also useful.

Other conditions being equal, a finer particle size of the frit normally will produce a more glossy and reflective surface. Batches of enamel were prepared with finely ground and relatively course frit. The effect of this variation is shown in Table I. The finer ground frit produced a considerably lower rate of back surface temperature rise.

*Table I.—Comparative heat test on electroplated and ceramic-gold coatings*

[Test panels—4 in. x 6 in. stainless steel type 316—heat flux=20 B.t.u./sec./ft.²]

| Coating | Rate of Temperature Rise of Back Surface of Panel | |
|---|---|---|
| | ° F./sec.[1] | Failure Temperature (° F.) |
| Ceramic-Gold: | | |
| Fine Ground Enamel with: | | |
| One coat bright gold RH | 9.7–10.9 | (2) |
| Two coats bright gold RH | 8.6–9.4 | (2) |
| Coarse Ground Enamel with: | | |
| One coat bright gold RH | 16.6 | (2) |
| Two coats bright gold RH | 11.2 | (2) |
| Electroplated Gold: | | |
| Plate No. 1 | 12.1 | 690 |
| Plate No. 2 | 10.0 | 690 |
| Plate No. 3 | 11.5 | 690 |
| Plate No. 4 | 10.9 | 690 |

1 Temperature rise below failure temperature.
2 Tests stopped at 1,000° F. No apparent change in these samples after exposure up to 1,000° F.

Increasing the refractory materials in a particular enamel formulation lowers the gloss while increasing the amount of fluxes improves the gloss. A particularly useful fluxing material found to greatly approve the gloss was lithium metasilicate. To provide as high a gloss as possible it is preferred that both fine grinding of the frit and lithium metasilicate be employed.

One of the most desirable properties of any enamel to be applied directly to a metal is adherence. The adherence between the enamel and the metal is a combination of mechanical and chemical bonding.

The chemical bonding between the enamel and the metal is improved by adding various metallic oxides to the enamel formations. Both nickel and chromium oxides improve the adherence of the enamel coat to the metal surface, especially to copper and stainless steel surfaces. Generally, adherence to stainless steel surfaces is improved when oxides of the alloying metals in the stainless steel are added to the enamel in proportion to their presence in the steel. Therefore, it is preferred to include these oxides in these optimum proportions in the enamels used in the practice of the invention.

The enamel coatings of the invention are applied in a thin layer of 0.001 inch to 0.002 inch in thickness. Because of the thin layer required, uniform application is essential. To accomplish this, the specific gravity of the enamel slip should be carefully adjusted and correct amounts of suspending agents or electrolytes should be added to the enamel formation in order to obtain the proper spraying consistency. The amounts of suspending agents or electrolytes required to achieve the desired thin enamel coating is easily determined by those skilled in the art by a few trial-and-error applications with the particular enamel being used. Moreover, the technique for applying the enamel can also affect the amount of suspending agents and electrolytes. Spraying, painting, and dipping techniques are satisfactory although spraying is preferred.

Table II lists two exemplary compositions that are particularly useful in the practice of the invention. The only difference in the two compositions is the incorporation of sodium silicate in the enamel to be applied to copper though the enamel is satisfactory without this addition. However, other enamels which resist high temperatures and possess the desirable properties set forth hereinabove can also be used.

*Table II.—Enamel formulations for application to copper and stainless steel surfaces*

| Ingredient and its Function | Amount for Application to Stainless Steel Surface, lbs. | Amount for Application to Copper Surface, lbs. |
|---|---|---|
| No. 5210 Frit [1], frit | 100.0 | 100.0 |
| Red Label Clay [1], suspending agent | 2.0 | 2.0 |
| Chromic Oxide, increases adherence | 1.0 | 1.0 |
| Nickelic Oxide, increases adherence | .5 | .5 |
| Lithium Metasilicate ($Li_2O.SiO_2$), increases gloss | .75 | .75 |
| Sodium Silicate, increases gloss and lowers firing temperature | .0 | .5 |
| Bentonite, suspending agent | .5 | .5 |
| Water, diluent | 33.4 | 33.4 |

[1] Product of Ferro Corporation.

The enamel is ball milled for sufficient time to obtain finely ground particles. Exemplary of the type of particle fineness desired is the following: A trace to ½ gram should remain on a 325 mesh screen per 100 grams of enamel slip. The specific gravity of the enamel slip should be adjusted to 1.78–1.80 in order to obtain good spraying consistency.

The above enamel compositions are unusual in that they have a glossy finish while enamels prepared with high temperature maturing frits previously produced only a relatively rough matted surface totally unsuitable as the base for a reflective coating. The success of the present invention arises in part from the development of glossy high temperature maturing enamels illustrated by the compositions of Table I.

The glossy finish is achieved by utilizing about 1.5% to 2.5% by weight enameler's clay based on the total weight of frit in the enamel in place of the 4% to 5% by weight normally found in high temperature maturing enamels. The optimum amount of clay appears to be about 2% by weight. Moreover, the gloss is improved even more if lithium metasilicate is employed as a flux in substantially the same amounts as the silicates of sodium and potassium normally used in high temperature maturing enamels of the prior art, generally from .7% to 1.5% by weight based on the total weight of frit. The glossy finish resulting from these changes in prior art compositions is not explicable or predictable in the light of the known prior art.

It will be apparent to those skilled in the art that other high temperature maturing frits and other enameler's clays can be substituted for the specific frit and clay set forth in Table I. Moreover, if desired, when lithium metasilicate is used as the fluxing agent, it may be employed alone or additional fluxing material may be added. The other constituents in the enamel depend on the type metal to be enameled, the technique of application, and other factors well known in the art.

Another advantage of the enamels illustrated by the composition shown in Table I is that no ground coat or base coat is required to provide adherence of the enamel to the metal surface. These enamels require only a single application directly to the surfaces of stainless steel, copper, and titanium. However, metals such as aluminum may require ground coats.

The actual application of the enamel is accomplished according to standard enameling techniques. After the enamel is applied to the metal surface it is allowed to dry. The drying process can be accelerated by heating if desired. The enamel coated metal is then fired to fuse or bond the enamel to the metal, the firing process taking place in a conventional enameler's oven or similar heating device. The temperature of the oven and the period of time required to fuse the enamel and the metal depends upon the thickness of the enamel coat, the composition of the metal, the composition of the enamel and other variables well known in the art. When applied to stainless steel the enamel illustrated in Table I fused when heated to 1650° F. for three and one-half minutes while on the copper surface fusion was completed after heating at 1550° F. for four minutes.

The manner in which the reflective coating is applied to the enamel is not critical as long as a smooth coat results. Metal can be vapor deposited in a vacuum according to standard techniques and actual reflectors produced in this manner proved very satisfactory. The preferred method for applying the reflective metal is to decompose by heating in the presence of air (that is oxygen) an organic resinate of the metal deposited on the surface of the enamel to volatilize the organic material, thus leaving a smooth even layer of metal. Additional heating then fuses the enamel to the reflective metal coating.

It is not possible to establish a definite period of time and a temperature range for decomposing and fusing the metal resinates since these factors vary with the particular resinate. However, the manufacturers always supply such information with their products and this will give operable ranges of time and temperature from which optimum ranges can easily be determined. The Liquid Bright Gold RH used on the illustrative examples decomposed completely by heating at 800° F. for 15 minutes and fused to the enamel by continued heating at 1300° F. for 30 minutes.

Many reflective metal resinate solutions are commercially available and suitable for obtaining the metal surface of the reflective coating. However, some metal-resinates contain less metal than others. This is a factor which must be considered as it is obviously necessary to use more of the resinates containing less metal to achieve the same thickness of metal which results from resinates which contain larger amounts of metal. The metal-resinate can be applied to the enamel by painting, dipping, or spraying although the spraying technique gives best results. Usually, the metal resinate solutions commercially available will require thinning with carbon tetrachloride, amyl acetate, or some other suitable thinner in order to acquire a proper spraying consistency.

For use with the enamels set forth in Table I on flame shields and infrared lamp reflectors, gold-resinates functioned well. There are many commercially available gold-resinates which can be employed in the present invention, Liquid Bright Gold RH (Hanovia Division of Englehardt Industries) containing 11% by weight gold being illustrative of these resinates.

To obtain the best results, the metal surfaces to be coated should be cleaned and slightly roughened. This can be accomplished by various standard methods well known to enamelers such as sandblasting, vapor degreasing, acid pickling, and heat treatment in an oxidizing atmosphere.

Steel surfaces and stainless steel surfaces can be prepared by the following procedure. First, any grease that may be present on the metal surface is removed by vapor degreasing. Next, the surface of the metal is roughened by fine wet-sandblasting (vapor blast). Finally, all sand particles on the metal are removed by washing with water, subsequently blowing with dry compressed air.

Copper surfaces are prepared by annealing the metal to remove gases from the metal. Otherwise the gases will escape during enameling and cause bubbles in the enamel surface. After annealing, the copper is pickled in an acid pickling bath at room temperature to remove scale and to etch the surface. Generally four to five minutes in the pickling bath is sufficient. After pickling the metal is thoroughly rinsed in water at room temperature, then neutralized with any basic solution normally used for this purpose. The copper is then rinsed with water and allowed to dry before enameling.

The following examples describe actual applications of the reflective coating of the invention to metal surface.

EXAMPLE I

A triangular segment of a stainless steel (type 316) flame shield having a base of two feet and a height of one foot is cleaned and the surfaces roughened according to the method for cleaning steel surfaces set forth above (that is, degreasing, sandblasting, and drying). The enamel formulation for application to stainless steel as described in Table III is ball milled for about 6 hours to obtain a particle fineness such that only a trace to ½ gram of enamel slip remains on a 325 mesh screen per 100 grams of enamel slip sifted. The specific gravity of the enamel slip is adjusted to a value of 1.78–1.80. The enamel is sprayed on uniformly on both sides of the metal surface in an amount that gives a dry weight of enamel of about 12 grams per square foot. The enamel coat then has a thickness slightly less than 0.002 inch after drying. After spraying, the enamel coated metal is dried and subsequently fired in a furnace at 1650° F. for three and one-half minutes to bond the enamel to the stainless steel.

The enamel coated stainless steel triangle is sprayed evenly with a solution of Liquid Bright Gold RH thinned with an equal part by weight carbon tetrachloride. No drying is necessary. The triangle placed in a furnace at 300° F. to dry the gold-resinate solution. The furnace door is left open to provide air (that is oxygen) and the temperature increased to 800° F. where it is maintained for 15 minutes in order to insure complete removal of all organic materials from the gold-resinate. The furnace door is closed and the temperature increased to 1300° F. for 30 minutes to bond the gold to the enamel. Thereafter, triangle is removed from the furnace and allowed to cool. The slight bloom which formed is removed by lightly polishing the surface with magnesium oxide powder, water, and cotton. The finished gold coating is approximately 0.000005 inch in thickness.

Care was taken throughout the operation to exclude dirt, dust, and water except in the steps where water was required.

EXAMPLE II

The copper reflector for an infrared lamp is annealed in a furnace at 1550° F. for five minutes. Following the annealing step, the reflector is pickled in a 10% by weight nitric acid solution at room temperature for five minutes to remove the scale and etch the copper. The reflector is rinsed thoroughly with water and neutralized in a borax solution containing .2% by weight $Na_2O$ at 200° F. for one and one-half minutes. After neutralization, the copper reflector is rinsed with water and allowed to dry.

The enamel formulation for application to copper as shown in Table II was ball milled to the same fineness as in Example I. The specific gravity of the slip was adjusted to between 1.77 to 1.78. The enamel coating uniformly sprayed on all surfaces of the reflector to a thickness of about 0.004 inch. This thickness gives a dry enamel coat weighing about 20 grams per square foot. After drying, the enamel is fired by placing the reflector in a furnace at 1550° F. for four minutes and thereafter removing the reflector and allowing it to cool to room temperature.

To the enameled surface is applied a gold-resinate solution which is prepared and sprayed in the same manner as Example I. The reflector thus treated is placed in a furnace at 300° F. to dry the gold-resinate solution. Leaving the furnace door open, the temperature is slowly increased to 800° F. to decompose the organic portion of the gold-resinate. This condition is maintained for 15 minutes and subsequently, the gold is bonded to the enamel by closing the furnace door and elevating the temperature to 950° F. for eight minutes. The slight haze on the gold surface following the last step is removed by light buffing with a paste of magnesium oxide and water on cotton swabs. As in Example I, care was taken to exclude dirt, dust, and extraneous water. The coefficient of thermal expansion of this enamel does not approach that of copper as nearly as desired. However, experimental tests and actual use showed that this factor did not present any disadvantage.

In the event that dust or other foreign matter does cause small voids in the reflective surface, these can be eliminated by applying another coat of gold-resinate and repeating the steps of the procedure relating to the gold coating as illustrated in Examples I and II. However, with reasonable care, it is not necessary to apply more than one metal coating. Moreover, as shown in Table I, two coats of gold give only slightly better reflective properties than a single coat.

The reflectivity of gold applied by the process of the invention and that applied by the standard electroplating technique was determined in the infrared region at a fixed angle of eleven degrees. Reflectance values for all samples was approximately 99% compared to a polished silver standard.

The bonding of the reflective metal film to the enamel is an important step. When the bonding temperature is too low, the gold will not adhere properly while overfiring dulls the gold finish and requires additional polishing. A few runs with the particular enamel and reflective metal coating at various temperatures will permit the selection of an optimum temperature and times.

To determine the effect of the final surface condition, one large section of a stainless steel flame shield was coated according to the procedure of Example I hereinabove. After bonding the gold to the enamel the section was halved. One half was polished lightly with a paste of magnesium oxide and water on a cotton swab. The other half was left in the "as fired" condition. Heat tests upon these samples indicated that light polishing of the surface decreased the rate of temperature rise by approximately 25%. The results of these tests are shown in Table III below.

*Table III.—Effect of final surface conditions on ceramic-gold coated samples*

| Test Conditions | Polished Sample | | "As Fired" Sample | |
|---|---|---|---|---|
| Heat Flux (B.t.u./Sec./Ft.²) | 20 | 60 | 20 | 60 |
| Rate of Back Surface Temperature Rise (° F./Sec.) | 18.3 | 59.6 | 25 | 113 |
| Maximum Temperature ° F., Test Stopped | 1,025 | [1] 1,546 | 1,025 | [2] 2,255 |

[1] No breakdown of surface near thermocouple.
[2] Breakdown of surface at approximately 1,850° F.; enamel softened, but base metal was still intact.

In order to obtain a direct comparison of heat resistance and reflectivity of electroplated and ceramic-gold surfaces, a set of four inch by six inch metal samples from a missile flame shield were prepared by each method. Both sets were exposed to a heat flux of 20 B.t.u./sec./ft.². The results of the test (see Table I) show that reflectivity of all samples is comparable, but the heat resistance of the ceramic-gold coated surfaces is markedly better than that of the electroplated gold surfaces.

These same ceramic-gold coated surfaces which withstood the tests as recorded in Table I were subjected to a flux of 60 B.t.u./sec./ft.$^2$ which is three times the heat flux normally used in testing. As recorded in Table III, breakdown of the ceramic-gold coating occurs between 1550° F. and 1850° F. at this high heat flux after a short period of time.

The ceramic coatings possess excellent adhesion to the base metals. A one inch steel ball dropped with a force of approximately 30 in./lb. at impact on the enamel coat of the copper surface caused chipping but no spalling. On an enameled steel surface produced according to the invention, dropping the steel ball in such a manner that the force at impact was still approximately 30 in./lb. produced no appreciable spalling or cracking. Sections of the stainless steel plate coated on both sides were bent around a mandrel ½ inch in diameter; again without appreciable spalling or cracking.

In actual flight, the flame shield undergoes flexing. To measure the ability of the ceramic-gold coating to withstand flexure, samples were tested in a Sunntag flexure-fatigue machine. No cracking or spalling in the coating occured under the test conditions listed in Table IV hereinbelow in any of eleven tests.

*Table IV.—Flexure-fatigue tests*

[All samples—Stainless steel type 316, 0.002″ thick.]

| Trial No. | Total Amplitude | Stress, p.s.i. | Cycles to Mechanical Failure |
|---|---|---|---|
| | A. Ceramic Enamel Coated 0.001″ Thick on Each side | | |
| 1 | 8°37′ | 40,000 | 4,022,000 |
| 2 | 8°37′ | 40,000 | 118,000 |
| 3 | 8°37′ | 40,000 | 522,000 |
| 4 | 8°37′ | 40,000 | [1] |
| 5 | 7°34′ | 35,000 | [1] |
| 6 | 7°34′ | 35,000 | [1] |
| 7 | 7°34′ | 35,000 | [1] |
| 8 | 7°34′ | 35,000 | 1,676,000 |
| 9 | 7°34′ | 35,000 | [1] |
| 10 | 7°34′ | 35,000 | 270,000 |
| 11 | 7°34′ | 35,000 | [1] |
| | B. Plain Uncoated Samples | | |
| 1 | 7°42′ | 35,000 | 1,053,000 |
| 2 | 7°42′ | 35,000 | 3,865,000 |
| 3 | 7°42′ | 35,000 | 969,000 |
| 4 | 7°42′ | 35,000 | 682,000 |
| 5 | 7°42′ | 35,000 | 1,455,000 |
| 6 | 7°42′ | 35,000 | [1] |
| 7 | 7°42′ | 35,000 | [1] |

[1] Test stopped at 10,000,000 cycles. No failure occurred.

The present invention readily lends itself to application in any area where polished metal reflectors are used to reflect radiant heat. In addition to flame shields and lamp reflectors, the reflective coatings of the invention will find application in the reflectors of radiant heaters. Moreover, the glossy high temperature enamels can be used to provide more heat resistant protective coatings for electrical and gas appliances and are not limited to the use as diffusion barriers in radiant heat reflective coatings. Moreover, certain other minor modifications will become apparent to those skilled in the art in the light of the above detailed description. Therefore, no undue limitation should be attributed to the invention except as set forth in the appended claims.

We claim:

1. A heat reflective device comprising a metallic substruction, a high temperature maturing porcelain high-gloss enamel coating on said substruction, and a reflective metal coating substantially no thicker than 0.00001 inch on said enamel.

2. The invention as set forth in claim 1 wherein said enamel, as applied to said substruction, is constituted substantially of:

| | Parts |
|---|---|
| Opacified titanium frit | 100 |
| Enameler's clay | 2 |
| Chromic oxide | 1 |
| Nickelic oxide | .5 |
| Lithium metasilicate | .75 |
| Bentonite | .5 |

3. The invention as set forth in claim 1 and wherein said device is the flame shield of a rocket propulsion unit, said flame shield comprising a metallic substruction material selected from the group of metals consisting of steel, stainless steel, and copper, said substruction having a covering of a high gloss high temperature maturing porcelain enamel, a reflective metal coating substantially no thicker than 0.00001 inch on said enamel, and wherein the said reflective metal is selected from the group of metals consisting of copper, gold, platinum, and silver.

4. The invention as set forth in claim 1 and wherein said reflective metal surface is the residue obtained from the pyrolysis of a resinate selected from the group consisting of copper resinate, gold resinate, platinum resinate and silver resinate.

5. A reflector for an infrared lamp comprising a metallic substruction, a high temperature maturing porcelain high-gloss enamel coating on said substruction, and a reflective metal coating substantially no thicker than 0.00001 inch on said enamel.

6. The invention as set forth in claim 5 and wherein said enamel, as applied to said substruction, is constituted substantially of:

| | Parts |
|---|---|
| Opacified titanium frit | 100 |
| Enameler's clay | 2 |
| Nickelic oxide | .5 |
| Chromic oxide | 1 |
| Lithium metasilicate | .75 |
| Sodium silicate | .5 |
| Bentonite | .5 |

7. The invention as set forth in claim 5 and wherein said reflective metal coating is the residue obtained from the pyrolysis of a resinate selected from the group consisting of copper resinate, gold resinate, platinum resinate and silver resinate.

8. In the art of manufacturing a radiant heat reflective device of the kind consisting essentially of a metallic substruction, a porcelain enamel diffusion barrier layer on said substruction, and a heat reflective metal layer on said diffusion barrier layer; a method of forming said diffusion barrier layer and said heat reflective metal layer which comprises the steps of:

(a) applying said diffusion barrier layer substantially no thicker than 0.004 inch to said substruction in the form of a mixture consisting substantially of opacified titanium frit 100 parts, enameler's clay 2 parts, chromic oxide 1 part, nickelic oxide 0.5 part, lithium metasilicate 0.75 part, bentonite 0.5 part, and water;

(b) drying said layer;

(c) subsequently firing the dried layer at a temperature of from 1550° F. to 1650° F. for a period 3 to 5 minutes;

(d) cooling said fired layer, and (e) providing said cooled diffusion barrier layer with a coating of reflective metal substantially no thicker than 0.00001 inch selected from the group of metals consisting of copper, gold, silver, and platinum.

9. The method specified in claim 8 as applied to a radiant heat reflective device wherein said substruction is constituted of copper and wherein the mixture specified for said diffusion barrier contains as an additional ingredient: 0.5 part sodium silicate.

References Cited by the Examiner

UNITED STATES PATENTS

| | | | |
|---|---|---|---|
| 230,864 | 8/1880 | Dode | 117—70 |
| 2,563,502 | 8/1951 | Sweo | 106—48 |
| 2,604,410 | 7/1952 | Bryant | 106—48 X |
| 2,662,028 | 12/1953 | Fenton | 106—48 X |
| 2,696,662 | 12/1954 | Le Sech. | |
| 2,701,214 | 2/1955 | Velonis et al. | 117—70 X |
| 2,733,167 | 1/1956 | Stookey | 117—46 |
| 2,842,457 | 7/1958 | Morgan et al. | 117—46 |
| 2,916,393 | 12/1959 | Velonis | 117—70 X |
| 3,176,678 | 4/1965 | Langley. | |

OTHER REFERENCES

Betz: Journal of American Ceramic Soc. 21, No. 5 (1938), pp. 189–191.

ALFRED L. LEAVITT, *Primary Examiner.*

RALPH S. KENDALL, *Examiner.*